(No Model.) 2 Sheets—Sheet 1.
C. J. HOLMAN.
HAND TRUCK.
No. 270,068. Patented Jan. 2, 1883.
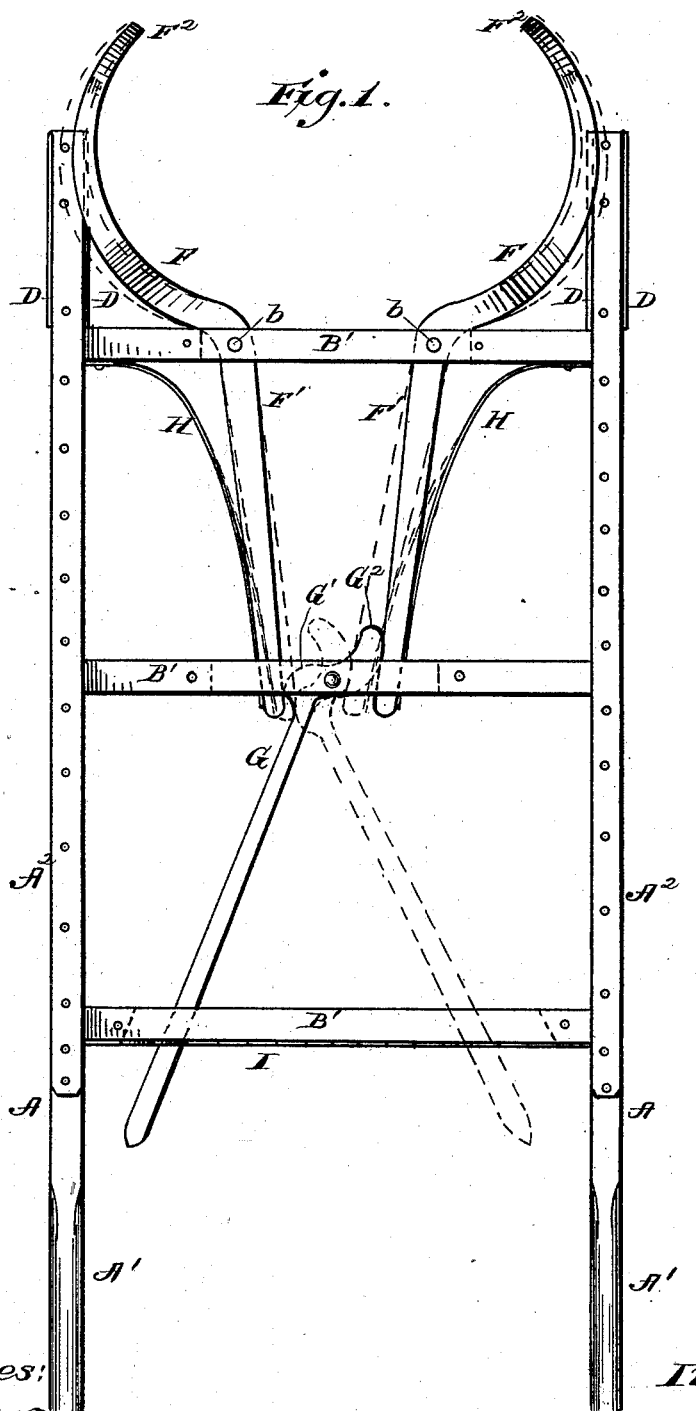
Witnesses:
C. L. Hyer
J. A. Rutherford
Inventor:
Calvin J. Holman
By James L. Norris
Attorney (No Model.)　　　　　　C. J. HOLMAN.　　　2 Sheets—Sheet 2.
HAND TRUCK.
No. 270,068.　　　　　　　　　Patented Jan. 2, 1883.
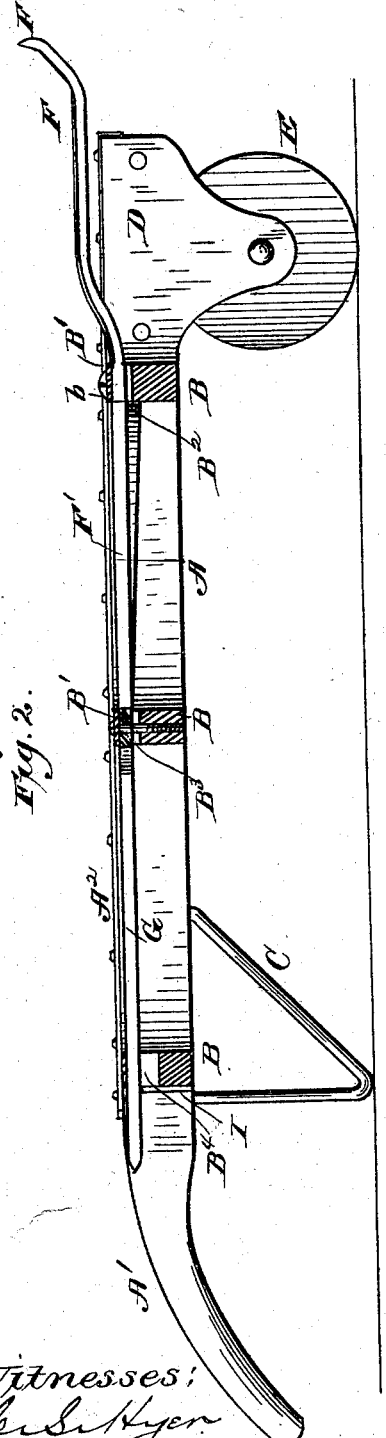
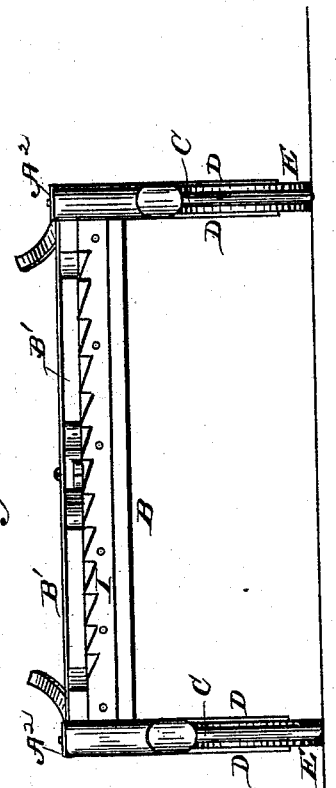
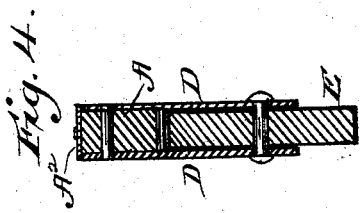
Witnesses:　　　　　　　　　　　Inventor:
　　　　　　　　　　　　　　　Calvin J. Holman
　　　　　　　　　　　By James L. Norris.
　　　　　　　　　　　　　　　　Attorney.

UNITED STATES PATENT OFFICE.

CALVIN J. HOLMAN, OF CHICAGO, ILLINOIS.

HAND-TRUCK.

SPECIFICATION forming part of Letters Patent No. 270,068, dated January 2, 1883.

Application filed July 21, 1882. (No model.)

*To all whom it may concern:*

Be it known that I, CALVIN J. HOLMAN, a citizen of the United States, residing at Chicago, in the county of Cook and State of Illinois, have invented new and useful Improvements in Hand-Trucks, of which the following is a specification.

This invention relates to an improved construction of hand-truck, which is especially designed for use in warehouses, stores, and the like, for moving barrels, boxes, bales, and other heavy articles.

The object of my invention is to provide simple and effective means for operating the pivoted jaws, so that they can be firmly gripped upon a barrel or other article to be carried; also, to provide means for locking the jaws after they have been adjusted; also, to provide certain improved details of construction and arrangement of parts, all as hereinafter fully described, and illustrated in the annexed drawings, in which—

Figure 1 is a top or plan view of my improved truck. Fig. 2 is a longitudinal section taken on a vertical central plane. Fig. 3 represents an end elevation of the truck as viewed from its rear or handle end. Fig. 4 is a vertical transverse section taken through the forward end of one of the side bars, and illustrates a pair of bracket-plates, with the truck-wheel between said plates.

The main frame of this truck consists of the two parallel side bars, A, which are connected together by means of the cross-bars B, secured at their ends in mortises formed in the side bars. These side bars terminate at one end of the frame in suitably-shaped handles A', and are provided at this end of the truck with supporting-legs C, each conveniently formed of a bent rod having its ends secured in the side bars. At the forward or wheel end of the truck a pair of metal bracket-plates, D, are secured to the end of each side bar, these plates being applied on opposite sides of the bars and extending downward from the same, so as to afford bearings for the axles of the truck-wheels E, which are mounted upon their respective axles, and one wheel arranged between each pair of bracket-plates.

In order to strengthen the side and cross-bars, which are preferably made of wood, on account of the lightness and cheapness of the material, metal straps B' are secured to the top sides of the cross-bars, and like straps A² secured to the top sides of the side bars, whereby the top sides of the truck-frame are metal-faced, and in addition to strengthening the same the metal will prevent injury to the frame from boxes or barrels placed thereon.

In order to grasp a barrel or other article, I provide a pair of expansible jaws, F, which are pivoted to the cross-bar and bent at their curved gripping ends, so as to extend over and rest upon the side bars, at the forward ends of the said bars, which latter, it will be observed, materially aid in supporting the jaws under a heavy load. These jaws, which are pivoted in a recess, B², formed in the upper side of the front cross-bar, lie under the metal plate or strip with which said bar is provided, the said strip constituting an upper bearing for the parts $b$ of the jaws. The rear or straight shank portions, F', of these jaws extend back and move in a like recess, B³, which is formed in the middle cross-bar of the truck-frame, and within said recess is pivoted the cam-lever G, which has its acting end located between the ends of the said jaw-shanks. The acting end of this lever is formed with the two cams G' G², respectively, located at opposite side of its fulcral point, so that when the lever is swung horizontally one way the cams will operate against the shank portions of both jaws, so as to spread apart said shank portions, and consequently contract the gripping ends of the jaws. When, however, the lever is moved in the opposite direction its two cams will be brought into a line substantially parallel with the jaws, whereby the shank portions of the jaws will be forced toward each other by springs H, and the gripping ends of said jaws thereby opened. In Fig. 1 the position of the jaws, when brought toward each other by moving the lever to one side, is indicated in full lines. The handle end of the lever passes through a recess, B⁴, in the rear cross-bar which is next to the truck-handles, and it works under the strap B', which is secured upon said bar, as already described. In order to lock this lever in position after it has been shifted, so as to adjust the jaws, I secure to the rear cross-bar of the truck-frame a rack-bar, I, with which the lever can be engaged after it has been shifted, so as to bring the jaws into the required position. The handle end of this lever extends back of the rear cross-bar, and hence is within convenient reach of the person handling the truck. The jaws are bent upward at their forward ends, as at $F^2$, so that when the truck is tilted said ends can be readily passed under a box or barrel, as in the case of an ordinary warehouse-truck. The curved gripping portions of the jaws bear upon and work over the metal-covered forward ends of the side bars, as illustrated in Fig. 1. This feature is of great advantage, since the bearings thus formed for the jaws support the same and prevent their becoming bent or broken by such weight as they may be subjected to.

In using this truck a barrel can be gripped by the jaws and carried in an upright position, or it can be tilted back upon the same, if desired. Boxes, bales, and other articles to be moved by the truck can also be carried in a similar manner. By employing the cam-lever greater leverage can be obtained than where the shank or rear portions of the jaws are extended back and operated by hand; and, moreover, by said lever the jaws are operated simultaneously.

What I claim is—

1. In a hand-truck, the combination, with the side bars provided at one end with handles and at the other end supported by truck-wheels and rigidly united by cross-bars, of the barrel-grasping jaws, independently pivoted to one of the cross-bars and extending longitudinally along the truck-frame, and a horizontally-swinging cam-lever pivoted to one of the cross-bars, between the free ends of the jaws, and projecting longitudinally along the truck-frame, between the side bars, within reach of the operator, and means for holding the cam-lever in its adjusted position, substantially as described.

2. In a hand-truck, the independently-pivoted barrel-grasping jaws extending longitudinally along the truck-frame, a cam-lever pivoted between the free ends of the jaws, and projecting longitudinally along the truck-frame to a position within reach of the operator, between the truck-handles, and a transverse rack-bar for holding the cam-lever in its adjusted position, substantially as described.

3. In a hand-truck, the combination, with the side and cross bars, of the barrel-grasping jaws pivoted to one of the cross-bars, and having their outer curved portions supported by the side bars of the truck, the horizontally-swinging cam-lever pivoted to one of the cross-bars, between the inner ends of the jaws, and projecting longitudinally along the truck-frame, within reach of the operator, between the truck-handles, and means for locking the cam-lever in its adjusted position, substantially as described.

In testimony whereof I have hereunto set my hand in the presence of two subscribing witnesses.

CALVIN J. HOLMAN.

Witnesses:
C. F. COLLOT,
L. R. C. SCHMIDT.